United States Patent [19]

Görike

[11] Patent Number: 4,571,746

[45] Date of Patent: Feb. 25, 1986

[54] COLLAPSIBLE HEADBAND

[76] Inventor: Rudolf Görike, Sternwartestrasse 57C, A-1180 Vienna, Austria

[21] Appl. No.: 469,295

[22] Filed: Feb. 24, 1983

[30] Foreign Application Priority Data

Mar. 1, 1982 [AT] Austria .................................. 768/82

[51] Int. Cl.[4] ........................ H04R 1/10; H04M 1/05; A42B 1/06

[52] U.S. Cl. .................................. 2/209; 179/156 R; 381/25

[58] Field of Search .............................. 2/209, 423, 6; 179/156 R, 156 A, 182 R; 181/129, 137; 455/149; 381/25, 74

[56] References Cited

U.S. PATENT DOCUMENTS

| | | | |
|---|---|---|---|
| 836,087 | 11/1906 | Callahan | 2/209 |
| 3,272,926 | 9/1966 | Falkenberg | 179/156 R |
| 3,327,807 | 6/1967 | Mullin | 179/156 R |
| 4,409,442 | 10/1983 | Kamimura | 179/156 R |
| 4,445,005 | 4/1984 | Furuhashi | 2/209 X |
| 4,517,418 | 5/1985 | Baran et al. | 381/25 X |

FOREIGN PATENT DOCUMENTS

| | | | |
|---|---|---|---|
| 1524956 | 4/1968 | France | 179/156 R |
| 1296160 | 11/1972 | United Kingdom | 179/156 A |
| 2103902 | 2/1983 | United Kingdom | 179/156 R |

*Primary Examiner*—Peter Nerbun

*Attorney, Agent, or Firm*—McGlew and Tuttle

[57] ABSTRACT

A headband comprises first and second headbands having their one ends pivotally interconnected and being foldable about their pivotal interconnection inwardly and outwardly in a single plane and having opposite ends with an earpiece carried thereby. Each of the headbands include at least three separate parts telescopically interengageable and which are of substantially equal lengths. Advantageously the central part may be made of plastic and includes a tubular portion into which the next adjacent part is telescopical. The tubular portions are advantageously provided at each end of the central part to permit a telescopic movement of each of the other parts into the middle part.

1 Claim, 15 Drawing Figures

COLLAPSIBLE HEADBAND

FIELD AND BACKGROUND OF THE INVENTION

This invention relates in general to the construction of headsets and in particular to a new and useful headband which comprises two headband assemblies which have their one ends pivotally interconnected and have earpieces at their opposite ends, which include at least three separate parts which are telescopically interengageable.

At the present time, headsets with such headbands are employed for small portable cassette or radio recorders. Their advantage is in their size permitting them to be put into the pocket of a garment when not in use. Prior art collapsible headbands of this kind usually comprise four parts of which two and two are telescopic. While telescoping them into each other, however, the free ends of the parts carrying the earpieces come to protrude from the guideways and, in collapsed state of the headset, stick out relatively widely. This makes their accommodation in a pocket difficult, or obstacles arise while trying to take them out.

SUMMARY OF THE INVENTION

The invention is directed to a design eliminating these drawbacks of conventional headset constructions.

In accordance with the invention the headband is made up of two headband assemblies each comprising at least three separate parts of substantially equal length and all of the parts being telescopically interengageable. Advantageously the central part includes tubular elements at each end with telescopic interengagement of the next adjacent part. Each part is advantageously curved to fit the contour of a person's head and the two outer parts may be folded inwardly to the middle part in an advantageous embodiment.

The advantage of the inventive design is primarily a further reduction in size of the collapsed headset, so that it can be accommodated in a garment pocket still easier than the prior art constructions. Further, the advantage is obtained that the individual parts of the headband are appreciably shorter than the conventional ones with the result that in connection with a specific design of the slideways, a lateral protrusion of free headband ends in a collapsed state can be prevented entirely.

To ensure the telescoping of the individual parts of the headband within one another, it is sufficient, in general, to provide each part at one end thereof with a slideway for the adjoining headband part. This is the most simple and inexpensive way of enabling the parts to telescope in each other. A risk is run, however, that with a careless or rough handling of the headset in a collapsed state, one of the free ends of the headband part will be bent off, thereby affecting the use of the headset. That is why in another embodiment of the invention, damaging of the headband part in a collapsed state is avoided by providing that the headset half parts with a center portion therebetween has slideways. Even if the slideways are designed as receiving structures for the end portions of the adjoining headband parts, they still form some protruding structure covering the free ends of the introduced headband parts to an extent protecting them against an inadvertent bending off. In accordance with the invention, the slideways may be provided at the two ends of the central headband part either at the same side, or at opposite sides. This makes allowance for various combinations in the in the mutual telescopic position of the parts, so that the designer may select a construction best suitable for the respective application. To provide for a smooth sliding of the headband parts in the guideways, a resilient element, such as a bent leaf spring, is mounted within each guideway.

Another embodiment of the invention eliminates substantially completely damages of the headband parts in a collapsed headset. To this end, the central part of each half of the headband is designed as an integral member comprising two adjacent or superadjacent flat tube-like portions. In this design, the adjoining parts disappear completely in the flat tubelike portions, so that the collapsed headset does not include any projecting part which might get caught in some way.

Instead of the two integrally united metallic tubelike portions, an elongated, slightly curved body of plastic may be employed which is designed with two adjacent or superjacent guideways having substantially rectangular cross sections. The length of the body of plastic substantially corresponds to that of the other parts of the headband.

According to another embodiment of the invention, two thin metal strips joggled with each other to a tubelike guideway may be substituted for the other tubelike structures.

Accordingly it is an object of the invention to provide a headband which may be folded into a small size and which includes a minimum of projecting parts which may interfere with its easy storage, for example in a person's pocket.

A further object of the invention is to provide a headband which includes two headband assemblies pivotally interconnected with each being made up of a plurality of parts which are telescopically interengageable and which carry earpieces at their opposite ends.

A further object of the invention is to provide a headset which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
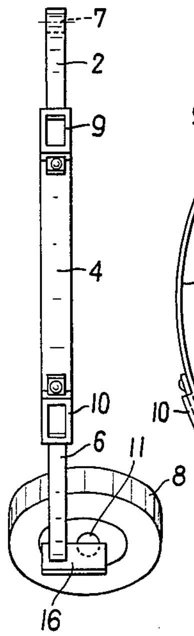
FIG. 2 is a side view of the headset shown in FIG. 1.
Figure 1:
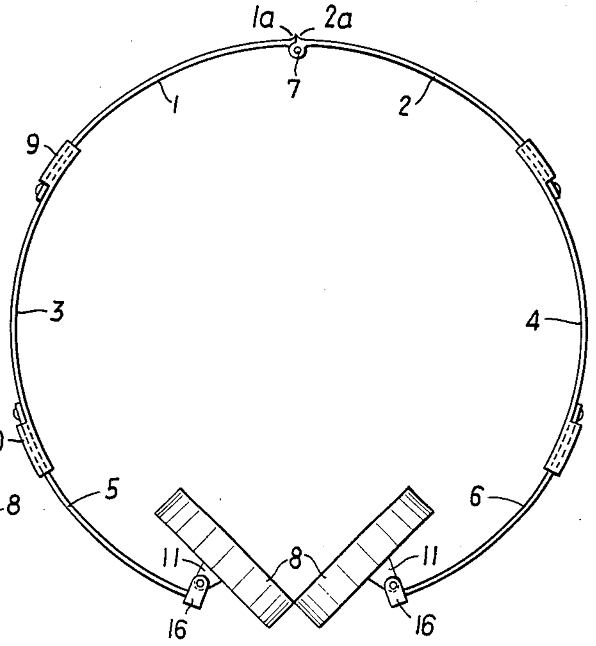
FIG. 1 is a side elevational view of a headset constructed in accordance with the invention.
Figure 3:
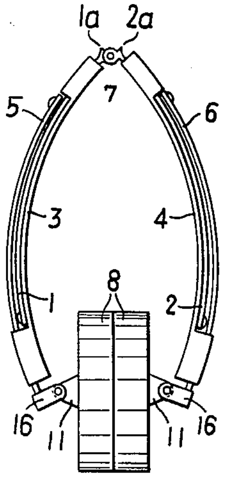
FIG. 3 is a view similar to FIG. 1 showing the headset in a collapsed condition.

Referring to the drawings in particular the invention embodied therein in FIGS. 1 to 3 comprises a headband assembly comprising a first and second headband having their one ends pivotally interconnected by a hinge 7 being folded about the pivotal interconnection inwardly and outwardly in a single plane. The headbands have opposite ends which carry a respective earpiece 8. Each of the headbands include at least three separate telescopically interengageably parts 1, 3 and 5 and 2, 4 and 6 respectively. The individual parts are substantially of equal length and advantageously the two end parts 1 and 5 and 2 and 6 respectively telescope into respective central parts 3 and 4.

FIG. 1 shows the individual headband parts 1 to 6. Parts 1, 2, 5 and 6 (the end parts) are preferably made from a stainless steel strip, while parts 3 and 4 (the central parts) may be made either of steel or of a plastic. Parts 1 and 2 are jointed to each other by means of a hinge 7 which have a limited opening angle determined by projections 1*a* and 2*a* which interengage when fully opened. The free ends of parts 5 and 6 carry each an earpiece, of which only the ear pads 8 of foamed plastic enclosing the electroacoustic transducer are shown. The side view of FIG. 2 shows that each of the earpieces 8 is connected to the free end of the carrier part 5,6 by means of a cross bar 16 and a kind of spherical joint 11. However, the earpiece may be connected to the carrying part in any other way.

FIG. 3 shows how the size of a collapsible headset is reduced by the inventive design. The overall length corresponds to about the length of one headband part 1 to 6, plus the radius of ear pad 8. It may further be learned from the figure that the collapsed headset has smooth surfaces substantially all around, and that there is no laterally projecting headband part which would cause trouble while accommodating the headset in a garment pocket.

Figure 4:
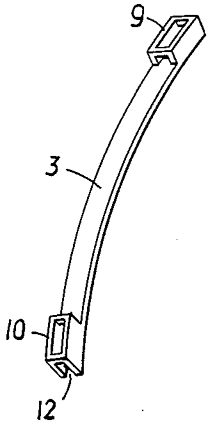
FIG. 4 is a front top perspective view of a central part of the headband.
Figure 5A:
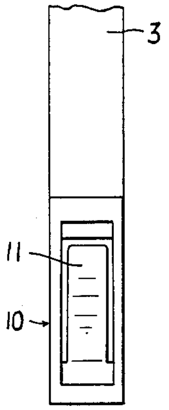
FIG. 5*a* is a partial view of one end of the central headband shown in FIG. 4.
Figure 5B:
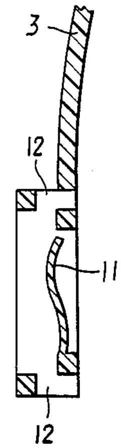
FIG. 5*b* is a partial sectional view of the headband shown in FIG. 3.
Figure 6:
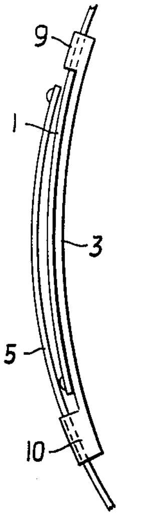
FIG. 6 is a partial side elevational view indicating one embodiment of the headband assembly construction permitting telescopic interengagement of the headband parts.

A structural detail of the inventive headband is shown in FIG. 4. This is the central part 3 or 4 provided in each of the hinged halves of the headband, between the two other, adjacent parts. Central part 3 is preferably made of a plastic and designed with a slideway 9, 10 at each of its ends, for guiding the adjoining parts 1 and 5 of the headband. The same of course goes for the central part 4 of the other half of the headband. FIGS. 5*a* and 5*b* are enlarged partial views of such a central portion 3,4, better showing the construction of a slideway 9 or 10. This slideway of FIG. 5 is provided, for example, at the end of part 3. Slideway 9 is formed by a frame structure having recesses 12 at the lengthwise opposite ends of part 3, through which the adjoining headband part, for example part 5, can be introduced. To ensure the desired extended position of use, and to prevent the collapsed headset from extending automatically, a kind of leaf spring is mounted within the frame structure, which is tensioned to push against the headband parts to be introduced. This not only enables the two connected headband parts to telescope smoothly and become fixed in their end positions, but also has the advantage that the free end portion of the introduced headband part (part 5 in the shown example) applies substantially completely to headband part 3, due to the lever action between the upper edge of the frame structure and spring 11, so that the end of the involved headband part is effectively prevented from protruding. FIG. 6 shows an arrangement in which the two slideways 9, 10 at the ends of headband part 3 are provided at the same longitudinal side. Then, the adjoining headband parts 1 and 5 extend at the outside of central part 3. In the same way, the two guides may be provided at the inside of part 3 in which case the adjoining parts would apply against the inner surface of part 3.

Figure 7:
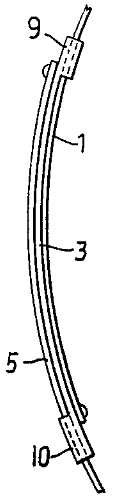
FIG. 7 is a view similar to FIG. 6 showing another embodiment of the invention.

FIG. 7 shows a design where one of slideways 9, 10, for example slideway 9, extend inwardly of part 3 while the other slideway 10 extends outwardly thereof. A vice versa arrangement is also possible, of course, with slideway 9 protruding outwardly and slideway 10 inwardly. In these designs, the adjoining parts, such as 1 and 5, introduced or to be introduced, extend at both sides of central part 3.

Figure 8:
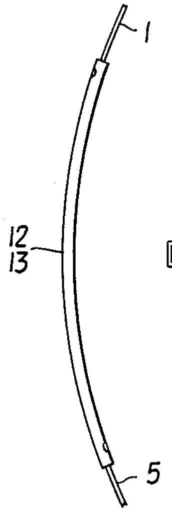
FIG. 8 is a view similar to FIG. 6 of still another embodiment of the invention.
Figure 9:
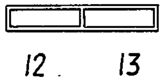
FIG. 9 is end elevational view of the central part shown in FIG. 8.
Figure 10:
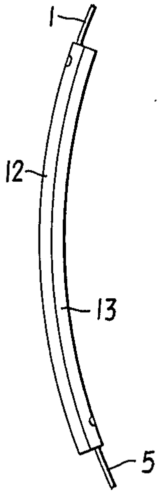
FIG. 10 is a view similar to FIG. 6 of another embodiment of the invention.
Figure 11A:
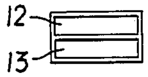
FIGS. 11*a*, 11*b* and 11*c* are end elevational views of various embodiments of the central part member shown in FIG. 10.
Figure 11B:
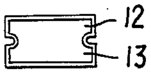
Figure 11C:
Figure 12:
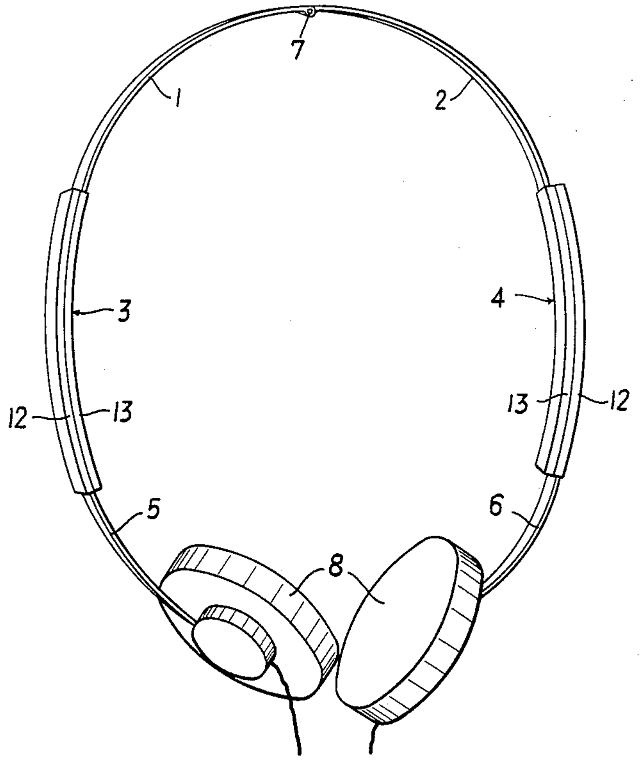
FIG. 12 is a perspective view of a collapsible headset in a position of use and constructed in accordance with the invention.

In still another embodiment of the invention, instead of a headband part shown in FIG. 4 and designed with separate slideways at its two ends, a channel or tubelike guideway structure is provided having a length corresponding to that of the other headband parts. This structure embodying an entire central part, includes two guideways in the form of metallic tube-like portions 12, 13 of aluminum for example, having preferably rectangular cross sections and united to each other to a single, integral member which is slightly curved to conform to the contour of the user's head. According to FIG. 8, the two guideways 12, 13 are provided in juxtaposition, as shown in the sectional view of FIG. 11. While according to FIG. 11*a*, each guiding portion is a closed guideway, and according to FIG. 11*b*, only two ribs from the guiding elements, the design of FIG. 11*c* provided that two metal strips 14,15 are bent to an interengaged, tubelike guideway strip, wherein one of the shaped strips is introduced in the other, as shown in FIG. 11*c* or both are interlocked by toggling or cramping. In both instances, upon collapsing the headset, the headband parts 1, 5 adjoining the central parts telescope into guideways 12,13 so that a quite smooth outer contour in the zone of the collapsed headband is obtained, having the above-mentioned advantages. FIG. 12 is a perspective view of such a headset having its central headband parts in each half of the headband designed as such tubelike structures. It is evident that even in position of use, a headset of this design hs substantially only smooth outside surfaces, which is advantageous particularly to users wearing long hair.

In the discussed example, it has been assumed that guideways 12, 13 are of aluminum or another metal. This is not necessarily the case. They may be comprised in a structure of plastic as well, with the walls thereof being only slightly thicker than in a design with metal, so that the volume increase is insignificant.

While specific embodiments of the invnetion have been shown and described in detail to illustrate the application of the principles of the invention, it will be understood that this invention may be embodied otherwise without departing from such principles.

What is claimed is:

1. A headband assembly comprising first and second headbands each having a first metal end, each first metal end being pivotally interconnected so that said headbands are foldable about the pivotal interconnection inwardly and outwardly in a single plane, said headbands each having a second metal end, an earpiece carried by each of said second metal ends of said headbands, said headbands each comprising at least three separate parts which are telescopically interengaged with each other and which are of substantially equal length, each of said headbands having a central part and a pair of metal strip end parts telescopically engaged with said central part, one metal strip end part of each headband carrying said first metal end and another metal strip end part of each headband carrying said second metal end, said central part of each headband being curved, being made of plastic and defining a pair of elongated rectangular channels which are substantially the same in length as lengths of said metal strip end parts so that said end parts can telescope into said channels with ends of said end parts opposite from said first and second ends of said headbands always being within said channels, said end parts being made of spring steel, the central part of each headband defining said channels to be one on top of the other and superimposed.

* * * * *